Figure 1:
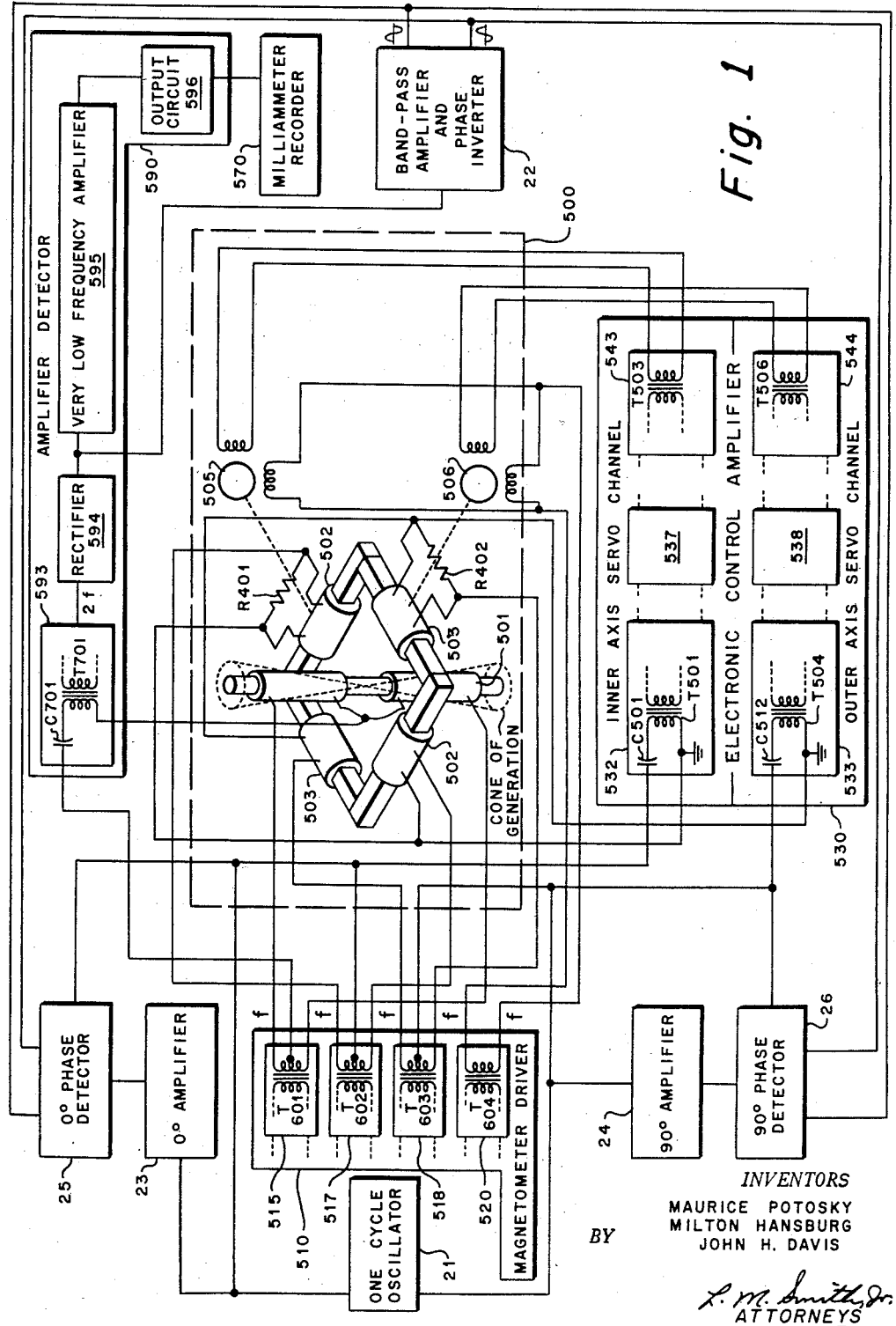

May 12, 1959    M. POTOSKY ET AL    2,886,773
ORIENTATION SYSTEM FOR MAGNETOMETERS
Filed Oct. 11, 1954    10 Sheets-Sheet 1

INVENTORS
MAURICE POTOSKY
MILTON HANSBURG
JOHN H. DAVIS
BY
L. M. Smith, Jr.
ATTORNEYS

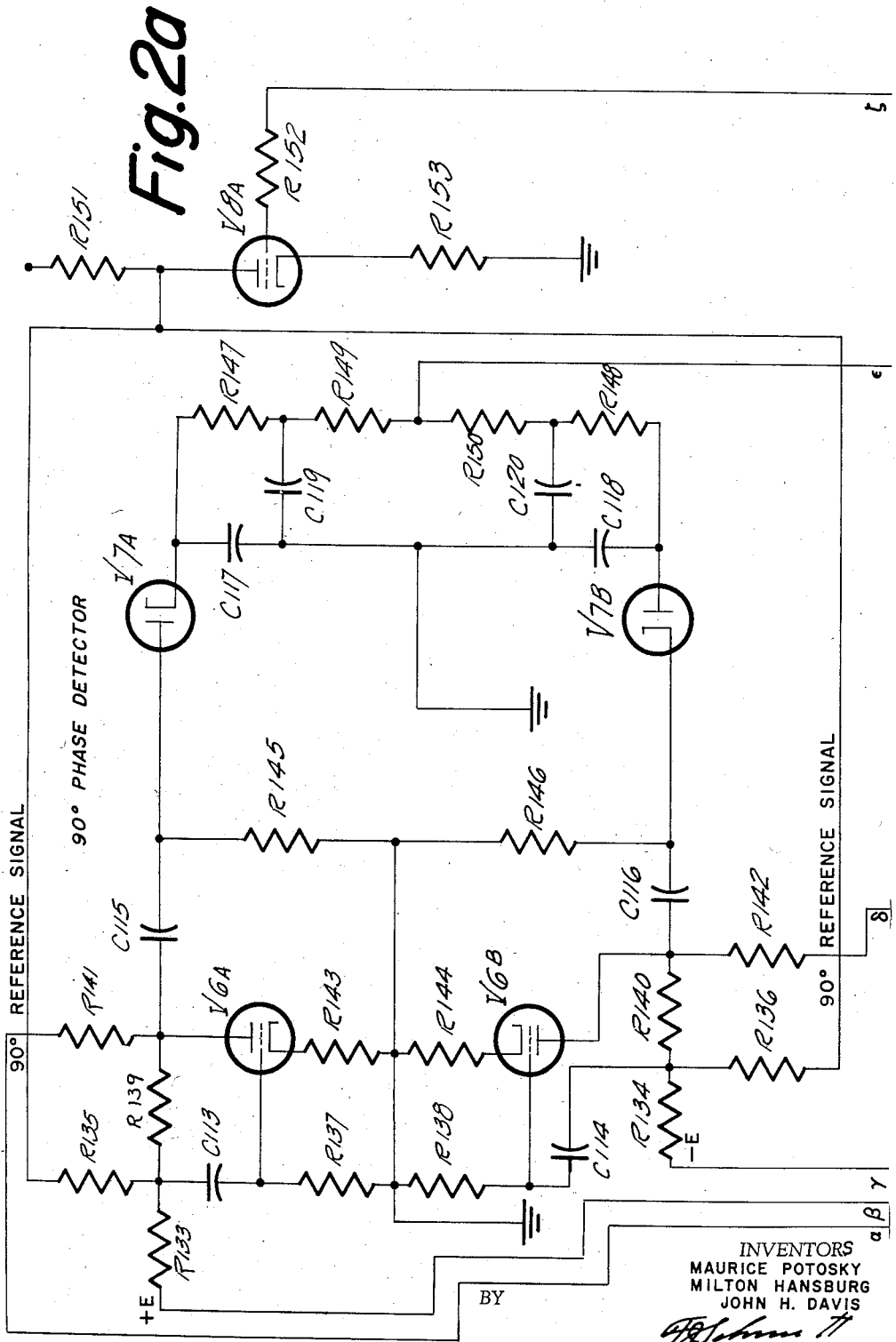

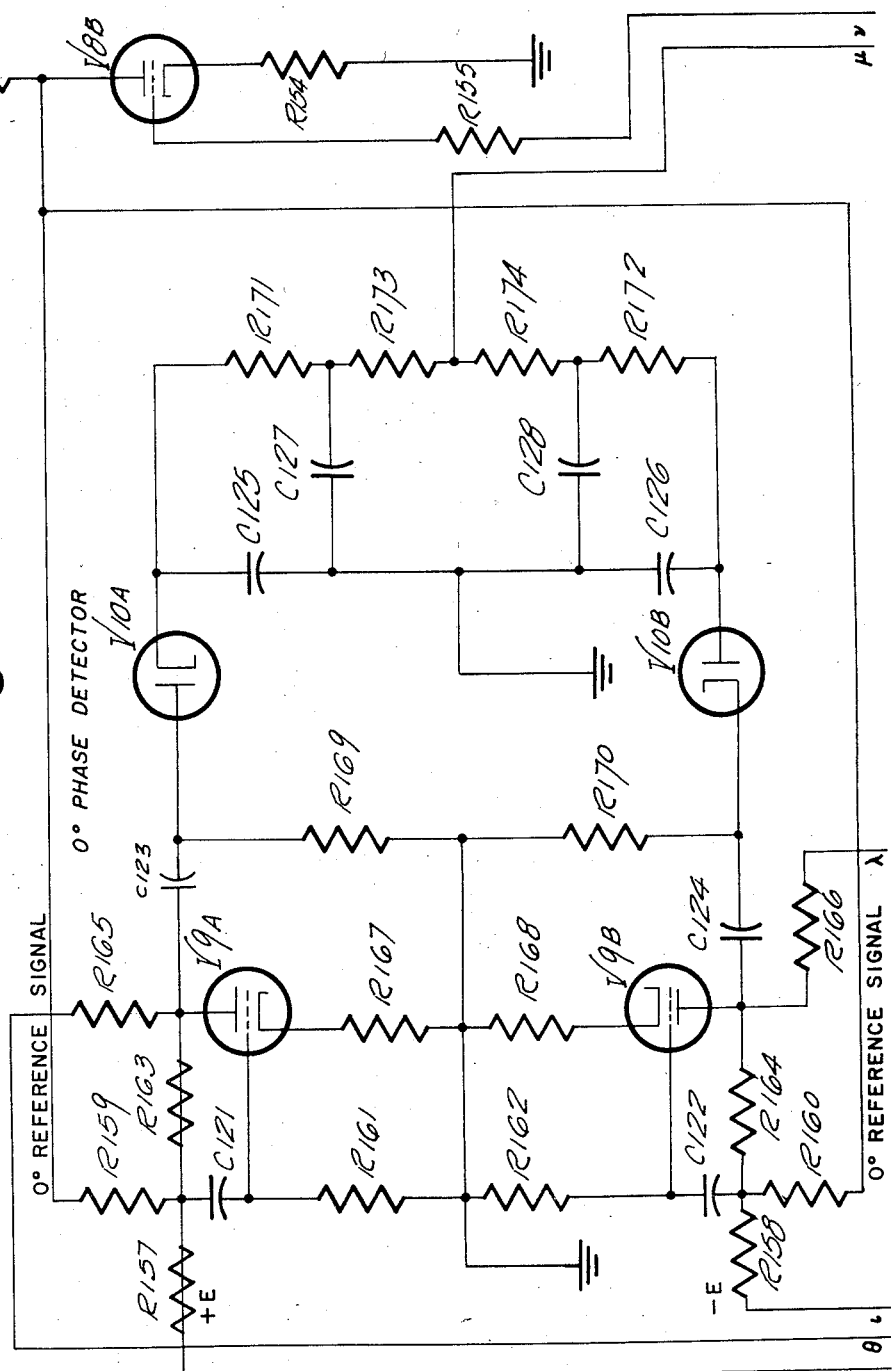

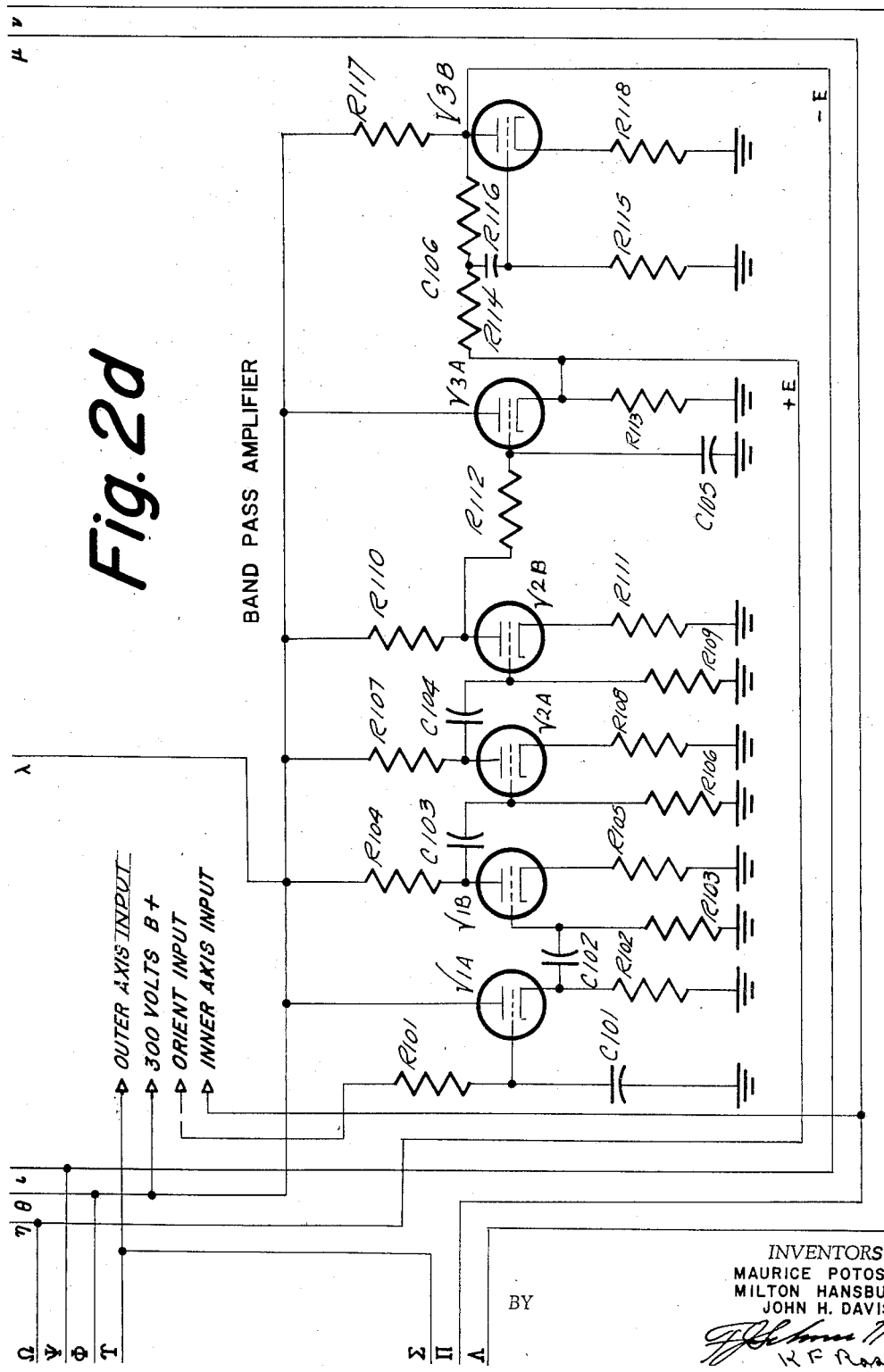

May 12, 1959  M. POTOSKY ET AL  2,886,773
ORIENTATION SYSTEM FOR MAGNETOMETERS
Filed Oct. 11, 1954  10 Sheets-Sheet 7

INVENTORS
MAURICE POTOSKY
MILTON HANSBURG
JOHN H. DAVIS
BY
ATTORNEYS

INVENTORS
MAURICE POTOSKY
MILTON HANSBURG
JOHN H. DAVIS
BY
ATTORNEYS

United States Patent Office 2,886,773
Patented May 12, 1959

2,886,773

ORIENTATION SYSTEM FOR MAGNETOMETERS

Maurice Potosky, Levittown, John H. Davis, Hatboro, and Milton Hansburg, Weisel, Pa.

Application October 11, 1954, Serial No. 461,696

9 Claims. (Cl. 324—43)

(Granted under Title 35, U.S. Code (1952), sec. 266)

The invention described herein may be manufactured and used by and for the Government of the United States of America for governmental purposes without the payment of any royalties thereon or therefor.

The instant invention relates to orientation for a magnetometer system for magnetic field investigation comprising three mutually perpendicular saturable core or similar directive magnetic field strength measuring devices called magnetometers and more particularly relates to a system for orientation of detector magnetometers with respect to the earth's total field vector.

Various forms of apparatus for magnetic field investigation are known. Although the invention is not to be construed as limited in application to any specific detecting set, one detecting set to which it has been successfully applied is the detecting set known to the United States Navy as the AN/ASQ–8 detecting set and described in the Handbook of Maintenance Instructions for Detecting Set AN/ASQ–8 CO–AN 16-30 ASQ–8–3 in a publication published under the authority of the Secretary of the Air Force and the Chief of the Bureau of Aeronautics dated March 1, 1951. This system is a magnetometer system comprising three mutually perpendicular saturable core or similar directive magnetic field strength measuring devices called magnetometers. Two of the magnetometers are the sensing elements respectively of two servo systems called an inner and outer axis servo. These servo systems operate to keep the inner and outer axis servo magnetometers in a position that senses zero magnetic field in the presence of the earth's magnetic field by aligning the servo sensing magnetometers with their sensitive axis prependicular to the earth's magnetic field vector. Because of the fact that the three magnetometers are mutually perpendicular and two of them seek a position at right angles to the earth's magnetic field vector, the sensitive axis of the third magnetometer is aligned with the earth's magnetic field vector so that it senses the total magnetic field strength. This third magnetometer is called the detector magnetometer. Thus, the magnetometer detecting set normally comprises an inner axis magnetometer, an outer axis magnetometer and a detector magnetometer. The problem to which the inventive apparatus relates is orientation of the detector magnetometer with respect to the earth's total field vector. Because of mechanical imperfections, the detector magnetometer may not be precisely perpendicular to the inner and/or outer axis magnetometers so that the necessary alignment of the detector magnetometer with a total field vector within the three minute angular tolerance required by the performance specifications for the magnetometer system does not exist. Orientation to which this invention relates consists of electrical testing and adjusting of electrical circuits to realign the servo magnetometers so that the detector magnetometer is aligned with the earth's total field vector within three minutes of arc. Former methods of accomplishing orientation of such detecting sets were all manual and were variations of the principle of deflecting the inner and outer axis respectively and successively a fixed amount and adjusting an orientation control until the magnetic signal from the right and left deflection of each axis were equal in amplitude. Batteries with reversing switches and sinusoidal signal generators connected successively to each axis were variations of schemes used. Another type of system used minimized the orientation problem by depending upon the sum of squares or alternatives thereto to minimize the need for orientation (see U.S. Patent No. 2,485,931, issued October 25, 1949 to T. Slonczewski for Magnetic Field Strength Indicator, filed April 20, 1943).

The old methods described above had many disadvantages, for example, they involved many switching operations, took a relatively long time, sometimes required readjusting of the earth's field balance control, sometimes a large mechanical misalignment of the detector magnetometer with orientor magnetometers resulted in improper orientation using old methods, they required the use of a battery, in most instances, any manual orientation required flight orientation checks every 40 to 60 minutes as a precaution to insure satisfactory alignment of the detecting element with the earth's field. It is quite evident that electrical servo systems employed for automatic orientation of magnetometers are inherently susceptible to physical creeping or drifting as a result of ambient temperature changes, vibration, noise, amplifier drift, etc. with consequence that its electrical zero may be different from that assumed by the plane of the orientor magnetometers for perpendicularity with the earth's field vector. The orientation systems used precluded development of a light weight towed magnetometer system especially of the type used in aircraft operating from aircraft carriers because with manual orientation a considerably larger towed cable was required.

The instant invention overcomes these and other pertinent disadvantages of the prior art and in addition, presents advantages of being easier to train personnel in the use of a manual orientation test set employing the principles of the invention as compared with training personnel to use prior orientation test sets, the inventive device is simpler and more reliable to use than the old manual method and on mounting the automatic orientation system of the instant invention in the electronic control amplifier of detecting sets, in-flight orientation and preflight orientation checks can be eliminated. Other advantages are that when the automatic orientation system of the invention is used, no special aircraft carrier test facilities are required for orientating tow bird installations of magnetic detection equipment as envisioned in the towed bird package concept where in flight orientation is usually not possible. Another advantage is that the automatic orientation system of the invention insures optimum orientation within its range control regardless of the nature and uniformity of the ambient magnetic field without adjustments and without interrupting operation of the equipment. A pertinent feature of the automatic orientation apparatus of the instant invention, therefore, is to nullify the effect of various factors previously noted which create for dynamic electrical unbalance in the servo channels of automatically oriented magnetometer systems, thereby assuring a superior degree of reliability in the alignment of the detecting element with the magnetic field vector of the earth. Any mis-orientation that may be introduced is of continual concern in magnetic field intensity mapping operations and it is highly desirable that presence of any minute amount of deviation be instantly observable. Accordingly, the invention simplifies the manual orientation of magnetometers by reducing to a minimum value the monitored indication of deviation, the amplitude of which is directly proportional to the amount of mis-orientation. In the automatic provision, the detecting element of the inventive orientation apparatus seeks automatically a null point or minimum value of this mis-orientation signal. The inventive principle employed in an embodiment of the manual and automatic orientation apparatus of the instant invention to overcome the deficiencies as were noted, utilizes a method of circular hunting which will be described subsequently. Deviation of the axis of a cone generated by the motion of the detecting element from coincidence with the earth's magnetic field produces a sinusoidal signal which is proportional to the deviation, and accordingly, means are provided for correcting the mis-alignment so as to reduce the mis-orientation signal to zero, corresponding therefore to a condition of coincidence with the earth's field. The invention provides, therefore, a supplemental orientation means to existing automatic orientation systems which upon embodying the inventive device, become capable of obtaining highly accurate and reliable values of magnetic field intensity.

An object of the present invention is to simplify manual orientation adjustment of magnetometers.

Another object of the invention is to provide for automatic orientation of magnetometers eliminating the need for manual orientation adjustment.

Another aim of the invention is to present an improved orientation system for magnetometers both in manual and automatic applications.

Another object of the inventive apparatus and method is to eliminate many switching operations in orientation procedure, reduce or eliminate the time necessary for orientation, eliminate requirements for readjusting of the earth's field balance control detecting sets, eliminate improper orientation where a large mechanical misalignment of the detector magnetometer with respect to orientator magnetometers occur, eliminate requirement for a battery in orientation procedures and to eliminate necessity for manual checks in flights every thirty to sixty minutes.

Still another aim of the invention is to facilitate development of a light weight towed magnetometer system especially required in operating from aircraft carrier, based aircraft and to eliminate the necessity of a large towed cable in such applications.

Another purpose of the invention is to provide for improved means to orient a detector set for detecting submarines containing a detector magnetometer and orientation magnetometers.

Figure 2:
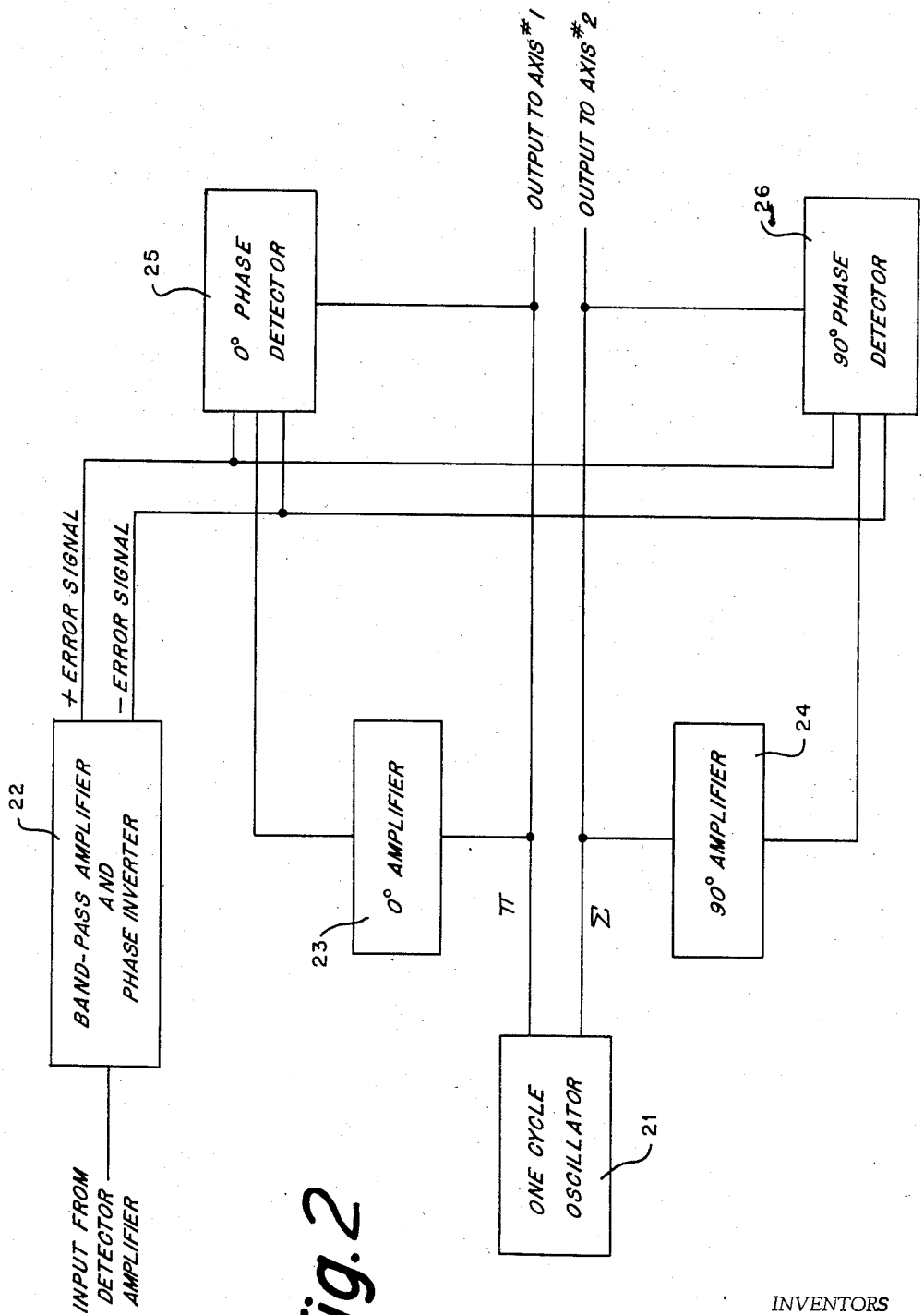
Figure 2B:
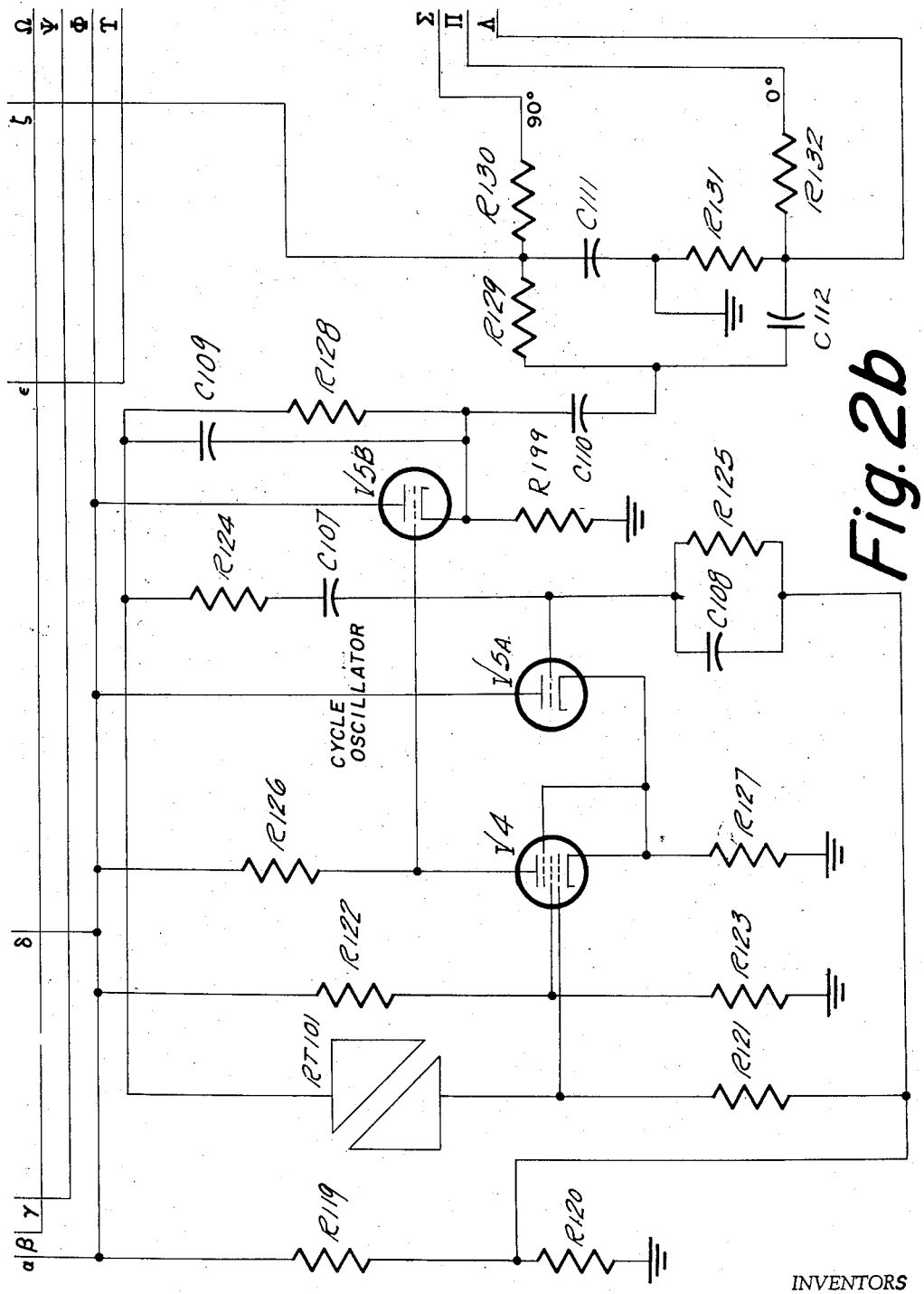
Figure 3:
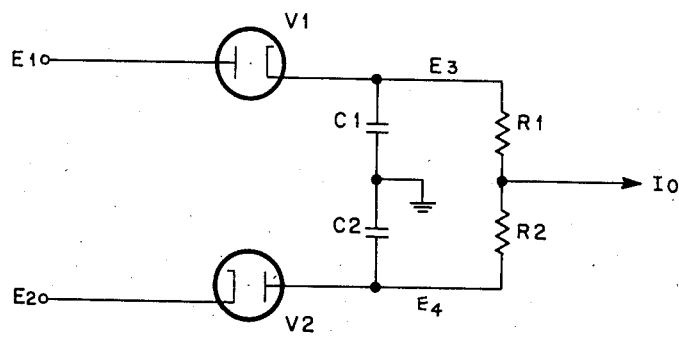
Figure 4:
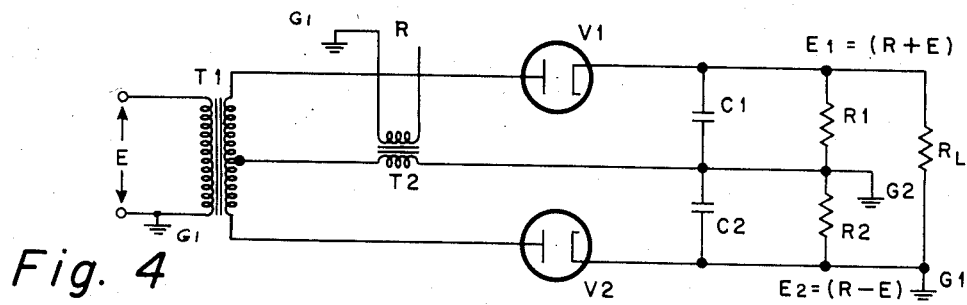
Figure 5:
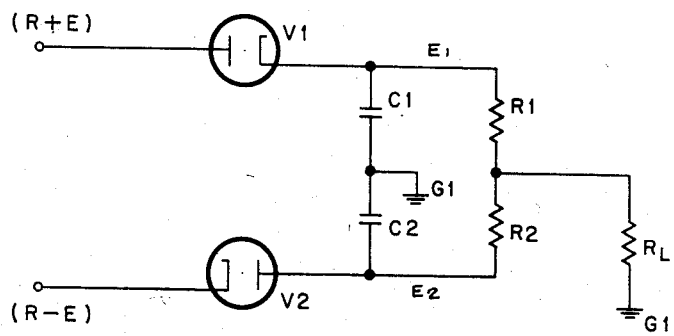
Figure 6:
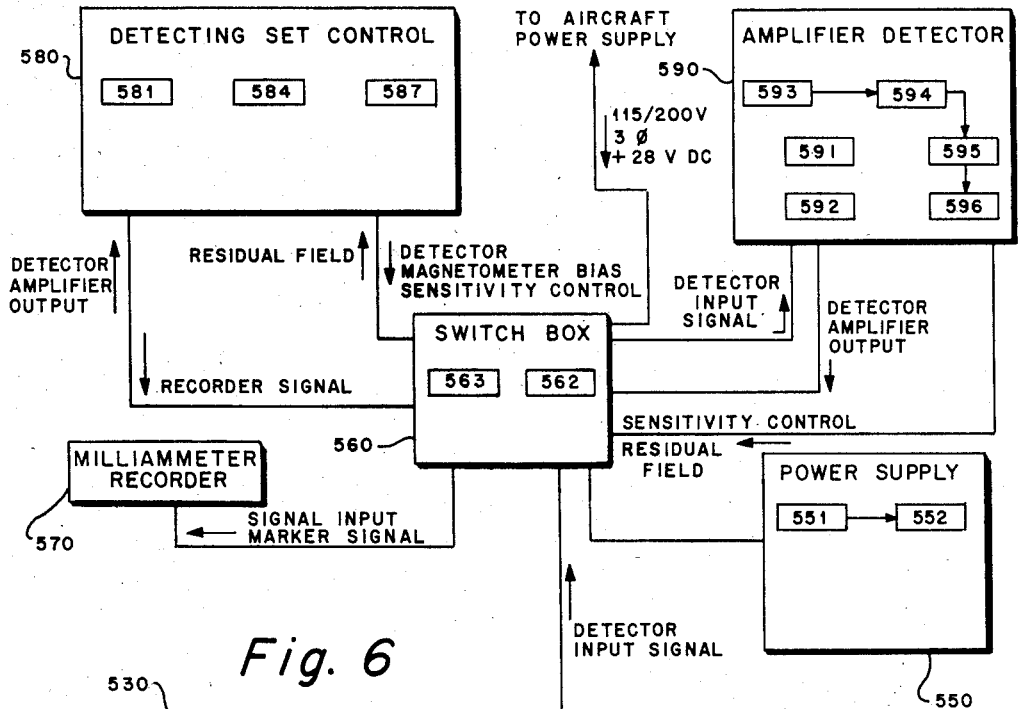
Figure 6:
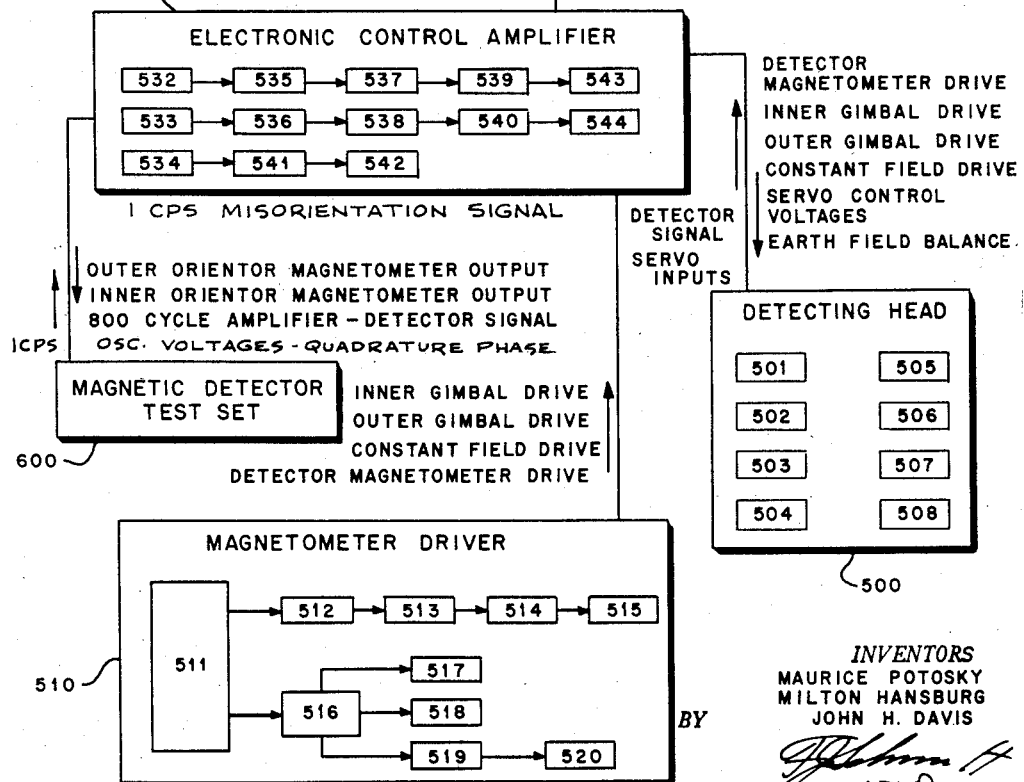
Figure 7:
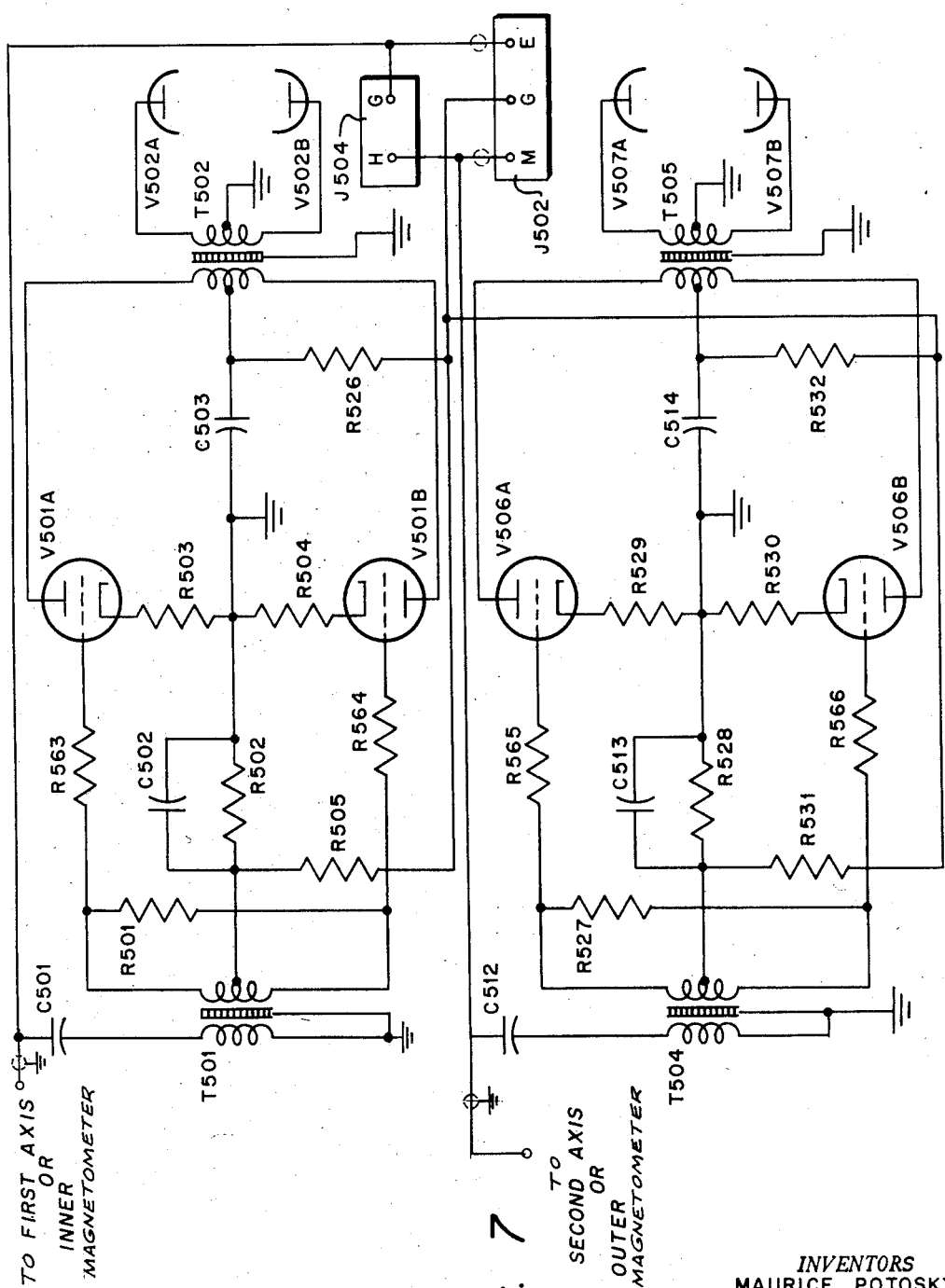
Figure 8:
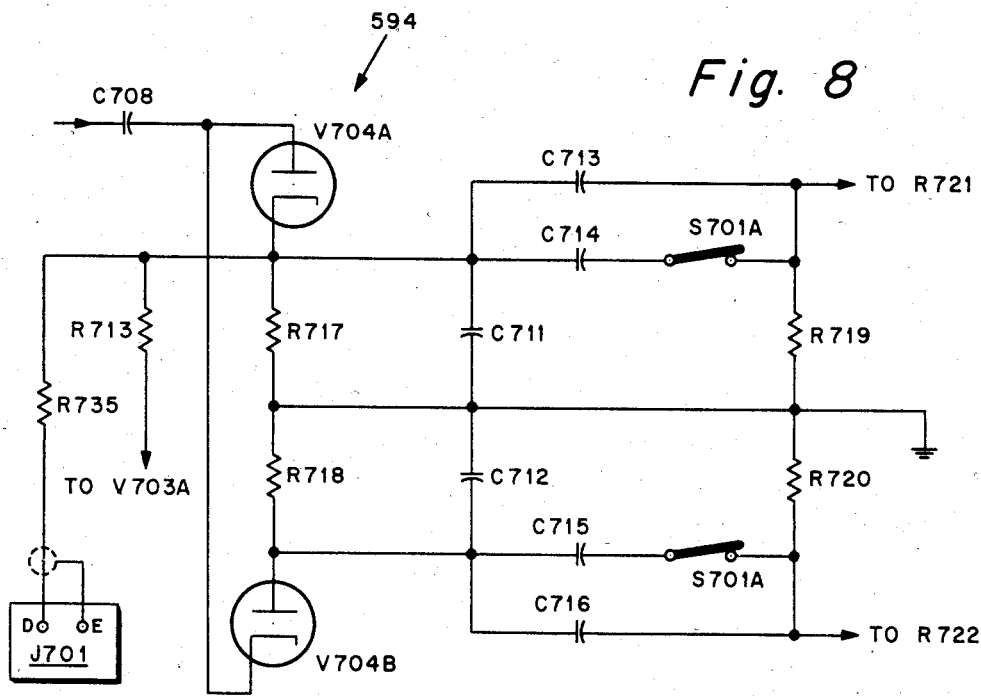
Figure 9:
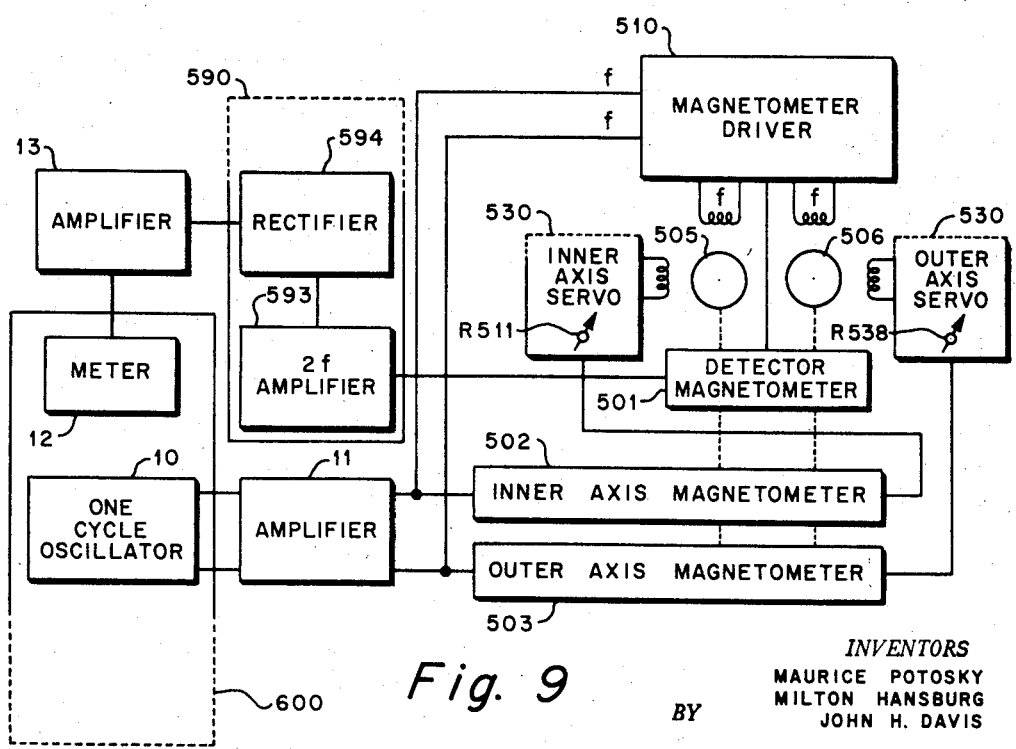

Other objects and many of the attendant advantages of this invention will be readily appreciated as the same becomes better understood by reference to the following detailed description when considered in connection with the accompanying drawings wherein:

Fig. 1 is a functional semi-schematic diagram of an illustrative embodiment of apparatus for effecting automatic orientation of a magnetometer detecting set in accordance with the principles of the instant invention, Fig. 2 is a block diagram representation of the circuits of the illustrative embodiment apparatus illustrated schematically in Figs. 2a, 2b, 2c, and 2d, Fig. 3 is a representation of a phase detector circuit for purposes of mathematical development of the principles of the inventive device, Fig. 4 is a representation of a voltage output detector utilized in the mathematical development of the explanation of the inventive apparatus, Fig. 5 is a schematic representation of the adder system of the invention to present a transformerless phase detector with a ground system which is common to the load ground system, Fig. 6 is a block diagram of the AN/ASQ-8 Detecting Set for which the illustrative embodiment was especially designed, Figs. 7 and 8 show schematically pulse amplifiers of the inner and outer axis servo channels and rectifier circuit of the Electronic Control Amplifier and Amplifier-Detector, respectively, of the apparatus of Fig. 6 showing appropriate junction points where the illustrative embodiment of the inventive system may be tied in with the AN/ASQ-8 detecting system, and, Fig. 9 is a block representation of a minimum necessary portion of test equipment necessary to effect manual orientation adjustment of the associated illustrative detecting set in accordance with the inventive principles.

As indicated heretofore, the inventive method and apparatus contemplates simplifying the manual orientation of magnetometers and attempts to provide for automatic orientation of magnetometers, thus eliminating the need for manual orientation.

A magnetometer is a device for measuring the intensity and direction of magnetic forces. One type of magnetometer used extensively in the type of equipment the inventive apparatus and method is designed to orient is that termed "saturable core magnetometers." Such magnetometers are used for both detection and servo positioning purposes. A saturable core magnetometer is a coil of many turns wound about a long, thin core of Permalloy or similar metal. Metal of this type is used because of its high initial permeability and because it saturates abruptly when the magnetic field intensity reaches a certain value. If a magnetometer is connected in series with a fixed resistance and together with the resistance is placed across a source of alternating current, for example, sinusoidal voltage alternating at 400 cycles per second, interesting phenomena occur. First, the flux density B within the magnetometer core is for a given coil and for zero external field, $$B = Gui = K_1 i$$

where G equals a constant determined by the size and shape of the coil and core $u$=permeability of the core material
$i$=instantaneous value of the current
$K = Gu$ This expression is true only when B is below the value required to saturate the core material. Thus, $i$ must be kept below a certain value of saturation, if saturation is not to occur. As long as saturation does not occur, the magnetometer is essentially a pure inductance and behaves accordingly in the circuit. If the applied voltage is increased the current will increase in the same ratio because the circuit is linear.

That is, $$i = K_2 E_s$$

where $E_s$=applied voltage

As $E_s$ increases $i$ will reach a value sufficient to cause the core material to saturate. Assuming the core material to have an ideal B—H characteristic, B becomes constant when the material saturates and the inductance becomes zero. When the core saturates, $i$ will immediately increase and the voltage $E_L$ across the inductance falls to zero. The current $i$ will be limited only by the series resistance R of the circuit and will be in phase with $E_s$. When $E_s$ decreases until $i$ falls below the saturation value, the magnetometer will again become inductive and $i$ and $E_L$ will return to their normal relations.

If there is a small component of external magnetic field continuously directed along the axis of the magnetometer, then for half of each current cycle the external field will oppose the internal flux and for the other half cycle it will aid the internal flux. Consequently, in the first half cycle the material will saturate later than it would with no external field, and in the second half cycle it will saturate sooner. This will give rise to wave forms wherein the current wave form is not symmetrical about the zero axis. Such nonsymmetry can be detected in several ways to indicate the presence of an external magnetic field such as would be caused by a submarine.

If the magnetometer equipment used to detect submarines uses magnetometers in pairs and so connected that they form a magnetometer bridge circuit in conjunction with driving transformers, greatly increased sensitivity is possible.

There are, in all, five possible magnetic fields that may act on a magnetometer:

(1) The A.-C. driving field H.
(2) The D.-C. earth's magnetic field.
(3) A D.-C. magnetic field set up by direct current for balance of the earth's magnetic field.
(4) An external but local D.-C. magnetic field set up by a submarine or any other ferro-magnetic body.
(5) External A.-C. magnetic fields of 60, 400, 800, etc., cycles per second which affect the operation of the magnetometer.

These magnetic fields cause undesirable noise and are to be avoided.

Magnetic field 4 above, is the one of interest in magnetic detection methods. This means that the others must remain constant so that the magnetometer bridge unbalance is disturbed only by 4.

The inventive apparatus and method involves orientation of detecting sets which may be of a type intended for use in military aircraft to indicate the presence of a submerged submarine.

These detecting sets are capable of detecting the anomaly in the earth's magnetic field caused by the magnetic field of the submarine. Irregular disturbances in the earth's magnetic field may appear as deflections of a zero-center meter or recorder. Such a device may have a detector magnetometer driven at 400 cycles per second, for example, and an amplifier-detector which makes use of the second harmonic (800 c.p.s.) output of the detector magnetometer bridge in detecting changes in external field caused by submarines and other anomalies. An orientor magnetometer pair for each of the two critical servo axes, namely, the first and second axes, may be provided. The two pairs, four magnetometers total may be arranged in the form of a square within the first axis plate and operate normally at right angles (or very nearly so) to the earth's magnetic field. Thus, they are operating essentially in a zero field, so there are no net output current (or voltage) pulses. First and second axis servo amplifiers are provided to operate from pulses produced in the two orientor magnetometer bridges. These magnetometers and attendant servo systems provided align the detector magnetometer in a direction parallel to the earth's magnetic field.

As indicated, the primary purpose of detecting set equipment is to detect small changes in the earth's magnetic field due to submarines. The equipment uses a sensitive magnetic field measuring element called the saturable core magnetometer and known as the detector magnetometer. This magnetometer may be excited or driven at 400 cycles per second and its second harmonic (800 cycles per second) output will be an accurate and sensitive indication of the presence of external magnetic fields. This 800 cycles per second signal voltage may be sent to an amplifier detector where it is amplified and rectified. Changes in this signal voltage then will indicate changes in magnetic field which might be caused by a submarine as the aircraft flies near it. Such changes may be recorded continuously in ink on the chart of a milliammeter recorder and it is this chart that the operator observes for signal indications of submarine presence.

To attach the detector magnetometer to the aircraft would be unsatisfactory because with aircraft turn, bank, and pitch, the detector magnetometer would also turn, bank and pitch. At some instant the magnetometer might be perpendicular to the earth's magnetic field, at which time the signal output would be zero, and at some other instant the magnetometer might be parallel to the earth's magnetic field, at which time the signal ouput would be maximum. The resulting signals would be tremendous, far greater than the small signals produced by a lurking submarine. Thus, it becomes necessary to fix precisely the orientation or attitude of the detector magnetometer with respect to the earth's magnetic field, not to the aircraft. A way of doing this is to use a servo-controlled gimbal system.

Two accurately controlled gimbals operating on axes perpendicular to each other may be used.

Servo-controlled voltages for the first and second axes may be obtained from orientor magnetometers similar to the detector magnetometer. These may be mounted in the plate which carries the detector magnetometer and when properly oriented, this plate and the orientor magnetometers may be disposed perpendicular to the earth's magnetic field and the detector magnetometer disposed parallel to it. Thus the orientor magnetometers normally operate in zero field and the first and second axes servo systems operate to keep the orientor magnetometers in this position. Pulse voltages from the orientor magnetometers may be amplified in servo amplifiers, modified and amplified for servo-motor control. It is this type of equipment which the inventive orientation system and apparatus is designed to align so as to permit detection of submarines by anomalies in the earth's magnetic field.

One important application of the inventive apparatus and method is to orient the detector magnetometer of such a device. As indicated heretofore, the inventive apparatus and method have been especially designed to operate with a particular device of this nature described in the Handbook of Maintenance Instructions for Detecting Set AN/ASQ-8, CO-AN 16-30 ASQ-8-3 published under authority of the Secretary of the Air Force and the Chief of the Bureau of Aeronautics, March 1, 1951. This particular device is shown in block diagram form in Fig. 6 and comprises a detecting head having a detector magnetometer 501 and first, second and third axis magnetometers, 502, 503 and 504, respectively, first, second and third axis motors 505, 506, and 507, respectively, third axis spray and pick-up coils 508, a magnetometer driver unit 510, supplies the 400 cycle per second voltage necessary for driving the inner and outer axis magnetometers as well as the detector magnetometer. In addition, a 400 c.p.s. constant filed voltage is supplied the reference phase of the split phase windings of all gimbal motors. Means for accomplishing this function include a 400 cycle per second master oscillator 511, which feeds into a phase inverter 512 followed by a tuned 400 cycle per second filter 513, 400 cycle per second amplifier 514, and tuned 400 cycle per second filter and 800 cycle per second trap circuit 515. A second phase inverter 516 following the oscillator feeds in common a pair of 400 cycle per second amplifiers 517 and 518, and a 400 cycle per second voltage amplifier 519 the output of which undergoes a stage of power amplification by power amplifier 520. The outputs of amplifiers 517, 518 and 520 thereby furnish the required excitation for first axis magnetometer drive, second axis magnetometer drive and constant field voltage for the three servo motors, respectively; an electronic control amplifier 530 contains circuits which are associated with the orientation of the detecting head relative to the earth's magnetic field vector. Three servo channels which are responsive to servo error voltages from the detecting head thus constitute the electronic control amplifier which comprises first axis and second axis pulse amplifiers 532 and 533 respectively, and a third axis amplifier 534, a pulse stretcher and rate circuit 535 and 536, respectively, mixers 537 and 538, low pass filters 539 and 540 and 400 cycle per second amplifiers 543 and 544 following the first axis and second axis pulse amplifier respectively, a tuned 400 cycle per second filter 541 and a 400 cycle per second amplifier 542 following the third axis amplifier 534, the 400 c.p.s. voltage output of amplifiers 543, 544, and 542 being therefore the servo control voltages supplied the control phases of the split phase windings of the first, second, and third axis gimbal motors, respectively; a conventional power supply 550, having 3-phase selenium rectifier 551 whose D.C. output is regulated by electronic regulator 552 provides the D.C. potential required of the AN/ASQ-8 Detecting Set. A switch box 560 serves as a convenient distribution means for various signal levels and A.C. and D.C. potentials in addition to housing fuses 563 and a power relay 562; a milliammeter recorder 570 provides a graphic means for the continuous recording of magnetic anomalies; a detecting set control 580 comprises the means for operating and controlling the detecting set as well as enabling the adjustment of circuit parameters relevant to the detector signal. Some of the more pertinent controls included in this unit are the earth field balance control 581, which is used in conjunction with the detector magnetometer bias circuit 587 to cancel the residual field of the detector magnetometer, the indication of this cancellation being observed on panel meter 584. An amplifier detector 590 is concerned with the detector signal which originates in the detector magnetometer, and the unit incorporates such circuits as are necessary for intelligent presentation of the magnetic anomaly signal for graphic recording at the milliammeter recorder. The amplifier detector 590 thus contains a meter circuit 591 and a HTA-LTA (heavier than air-lighter than air) switch 592, an 800 cycle per second amplifier 593, a rectifier 594 the detected signal output of which is a common input to the meter circuit 591 and a very low frequency amplifier 595, and an output circuit 596 to feed the amplified detected signal to the milliammeter recorder 570. Switch 592 is effective to selectively vary the bandwidth of low frequency amplifier 595 conterminously with the character of the vehicle incorporating the magnetometer instrument. A portion of this switch is illustrated as S701A in the amplifier-detector circuit of Fig. 8. Inasmuch as this apparatus is known as the detecting set identified above and described in the manual, a full description of operation of this apparatus will not be presented. However, Fig. 6 and the description above are included to show the type of apparatus which the inventive device is designed to orient.

There is in existence a magnetic detector test set 600 shown in the lower left corner of Fig. 6 and known as the TS-701-A/ASQ Magnetic Detector Test Set for the Magnetic Detecting Set AN/ASQ-8. A handbook of instructions exists for this set describing it, namely, Handbook of Operation and Maintenance Instructions for Magnetic Detector Test Set TS-701-A/ASQ for Magnetic Detecting Set AN/ASQ-8 which has an unofficial number CO-AN-16-35 TS-701A-2 prepared by the Naval Air Development Center, Johnsville, Pa. This magnetic detector test set was a concurrent development along with the automatic orientation apparatus of the instant invention and was designed for the purpose of orienting the detecting set above described in accordance with the inventive principles and is one existing equipment which may be used with the inventive method to orient the detector magnetometer in a detecting test set. This equipment may be utilized because it contains the one cycle oscillator and the milliammeter required in the illustrative embodiment of the orienting apparatus as shown in Fig. 9. By appropriate connection into the inner and outer axis magnetometers and the detector amplifier as shown in Fig. 7 and Fig. 8, respectively, this set may be used or a set designed in accordance with Fig. 9 of this application may be used.

As described above, the invention relates to orientation for a magnetometer system comprising three mutually perpendicular saturable core or similar directive magnetic field strength measuring devices called magnetometers. Two of the magnetometers are the sensing element respectively of two servo systems called an inner and outer axis servo. These servo systems operate to keep the inner and outer axis servo magnetometers in a position that senses zero magnetic field in the presence of the earth's magnetic field by aligning the servo sensing magnetometers with their sensitive axes perpendicular to the earth's magnetic field vector. Because of the fact that the three magnetometers are mutually perpendicular and two of them seek a position at right angles to the earth's magnetic field vector, the sensitive axis of the third magnetometer is aligned with the magnetic field vector so that it senses the total magnetic field strength. This third magnetometer is called the detector magnetometer. Thus, the magnetometer system comprises an inner axis magnetometer, an outer axis magnetometer, and a detector magnetometer.

Because of mechanical imperfections, the detector magnetometer may not be precisely perpendicular to the inner and/or outer axes magnetometers so that the necessary alignment of the detector magnetometer with a total field vector within the three minute angular tolerance required by the performance specifications for the magnetometer system does not exist. Accordingly, this invention develops a system of orientation consisting of electrical testing and adjusting of electronic circuits to realign the servo-magnetometers so that the detector magnetometer is aligned with the earth's field vector within a critical factor (for example, three minutes of arc).

When a small current is injected into the inner or outer (first or second) servo magnetometer of the detecting set, the servo system moves the magnetometer in such a direction and to such an amount that a component of the earth's magnetic field vector along the sensitive axis of the servo magnetometer just cancels the magnetic field created by the small injected current. By this process the current will cause the detector magnetometer to be deflected through an arc, the magnitude of which is directly determined by the amount of current for a given coil and the earth's magnetic field vector.

In accordance with the invention by applying simultaneously two equally sinusoidal currents in quadrature phase to the inner and outer axes magnetometers, the detector magnetometer is made to describe a circular path which is best shown greatly exaggerated in dotted outline in Fig. 1 as a cone of generation. When the detector magnetometer is perfectly aligned in the sense described above, in traveling the circular path imposed by the quadrature phase currents, it will make a constant angle with the total field vector so that no varying magnetic signal will be generated by the circular motion. Should a misalignment along either the inner or outer axis occur, the angle between the detector magnetometer and the earth's field vector will vary during the motion through the circular path. This angular variation will generate a varying magnetic signal of a frequency equal to that of the impressed sinusoidal quadrature phase currents. This signal can be amplified by an A.C. amplifier and indicated on a panel meter or on an auxiliary recording milliammeter.

Manual adjustment of the inner and/or outer axis orientation controls can then be made until the varying magnetic signal is minimized and finally nearly or completely eliminated by proper adjustment of both controls.

Harmonic distortion and the impressed quadrature phase sinusoidal currents will prevent complete elimination of signal at proper orientation control settings. However, a minimum signal will occur at the proper settings.

The inventive apparatus for thus manually orienting the detecting system is shown in Fig. 9 wherein a one cycle oscillator 10 which is contained in Detecting Test Set 600 may be conveniently used to generate two equal sinusoidal currents in quadrature phase which are applied to the inner and outer axis magnetometers, 502 and 503, respectively. An amplifier 11 may be provided if the signal from the oscillator is too small. This applied voltage will cause the detector magnetometer 501 to describe the circular path heretofore mentioned by motion imparted from the servo motors 505 and 506, respectively, which are shown to mechanically drive the plane of orientor magnetometers as indicated by the dotted line notation. Deviation from correct alignment of the detector magnetometer will cause angular variation between the detector magnetometer and the earth's magnetic field vector producing a modulation of the magnetic signal of a frequency equal to that of the impressed sinusoidal quadrature phase currents. This signal is amplified and demodulated by harmonic amplifier 593 and rectifier 594, respectively, of amplifier detector 590 and may be further amplified by amplifier 13 and indicated on milliammeter 12, for example. By manual adjustment of inner and/or outer axis orientation controls R511 and R538 of the inner and outer axis servo channels, respectively, of electronic control amplifier 530, the varying magnetic signal generated in the detector magnetometer as a direct result of mis-alignment with the earth's magnetic field is minimized and finally nearly or completely eliminated by proper adjustment of both controls. This sinusoidal signal can be read on milliammeter 12 for minimum varying magnetic signal. A magnetometer driver 510 supplies the necessary driving voltage of frequency, $f$, for the bridges of the detector and orientor magnetometers, as well as a reference phase voltage for the split phase windings of servo motors, 505 and 506. It should be noted that the dotted line extension of detecting set 600 and amplifier detector 590 is for the purpose of indicating other structure therein having functions not directly related to manual orientation, and is omitted therefore for reason that it is considered incidental to the understanding of the manual orientation feature of the inventive apparatus.

Automatic adjustment of the inner and/or outer axes orientation control can be accomplished by employing a phase sensitive detector and amplifier and applying the detected current to the inner and/or outer axis magnetometer in such a way as to cause an angular reorientation of the servo magnetometers to bring the detector magnetometer into the desired orientation. The automatic orientation system is shown in semi-schematic form in Fig. 1 of the drawings, while Fig. 2 is a block diagram of the inventive automatic orientation apparatus taken by itself, and illustrated in schematic form on supplementary Figs. 2a, 2b, 2c, and 2d of the drawings. It should be noted that only the structure of the AN/ASQ-8 Detecting Set of Fig. 6 which is pertinent to an understanding of the novel features of the instant invention is incorporated in the drawing of Fig. 1, and only fragmentary views are shown of structure known to be old in the art. The following description of operation and components of the automatic orientation system is best made with reference to these drawings.

The embodiment of the automatic orientation apparatus as shown in the semi-schematic drawing of Fig. 1 comprises elements in common with those for manual orientation as shown in Fig. 9, and as illustrated, Fig. 1 depicts a detector magnetometer 501, inner and outer axis magnetometers 502 and 503, respectively, which are mounted mutually perpendicularly with the detector element and arranged to be mechanically driven along their respective axes as indicated by the dotted line notation by servo motors 505 and 506, respectively. Resistors R-401 and R-402 are provided the bridge circuits of the orientor magnetometers to introduce a small signal level for purposes of nullifying effects of noise and interference. The detecting head comprises element 500. A magnetometer driver 510 supplies at the output secondaries of transformers T601, T602, T603, and T604, the required driving voltages of frequency, $f$, for all the bridge magnetometer circuits and reference phase windings of the servo motors. An electronic control amplifier 530 comprises in a fragmentary showing the inner and outer axis channels. Since the structure therein contained is known to be old in the art, only such pertinent components as pulse amplifiers 532 and 533, mixers 537 and 538, and amplifiers 543 and 544, are illustrated to indicate the general type of circuits that are contained and which function to supply the required levels of A.C. voltage at the outputs of secondary windings of T503 and T506 to the control phases of the servo motors. An amplifier detector 590 comprises a harmonic amplifier 593, in which the anomaly signal is derived across windings of transformer T701 which is in series with the center-tap of T601, the output driving transformer for the detector magnetometer; a rectifier 594, a low frequency amplifier 595 whose input detected signal is also common to bandpass amplifier and inverter 22, and an output circuit 596 whose output signals proportional to the intensity of the magnetic anomaly being observed is recorded on milliammeter recorder 570. A dual output oscillator 21 having voltages in quadrature phase are introduced into the inner and outer axis magnetometers through the center-tap of secondary winding of transformer T602 and T603, respectively, and it is to be noted that the circuit path is also in common with the correction voltage outputs of the 0° and 90° phase detectors 25 and 26, and the input circuits of the inner and outer axis servo channels, C501—T501, and C512—T504, respectively. Amplifiers 23 and 24 are conventional and supply the quadrature voltages of oscillator 21 for application to the 0° and 90° phase detectors as reference voltages.

In operation, when the axis of the cone generated by the detector magnetometer 501 of the detecting set is misoriented with the magnetic field vector, a sinusoidally modulated error signal of the frequency determined by the oscillator (e.g. one cycle per second with the oscillator 21 shown) and of a phase determined by the relative misorientation of the inner and outer axis (e.g. 45 degrees for equal misorientation of inner and outer axis) is received from the detector magnetometer. This sinusoidally modulated error signal introduced at the input of the detector amplifier is amplified and demodulated by harmonic amplifier and rectifier 593 and 594, respectively. This error signal is further amplified and filtered in the band pass amplifier 22, so as to receive only the oscillator frequency (e.g. 1 cycle per second) in order that the automatic orientation system will not respond to the magnetic signals derived from submarines and occurring in the frequency range of .02 to .3 cycle per second for lighter than air applications This sinusoidal error signal undergoes phase inversion, appearing in the output of the bandpass amplifier 22 as sinusoidal error signal voltages of opposite phases which are applied phase detectors 25 and 26, and added to the zero degree (0°) phase signal from oscillator 21 in such a manner that one of the dual phase detectors 25 and 26 detects the zero degree phase reference signal plus the error signal and the same detector detects the zero degree phase reference signal minus the error signal in such a manner that the resultant output is a D.C. current proportional to the zero degree component of the error signal. The zero degree and quadrature phase signals from the oscillator have been amplified in amplifiers 23 and 24, respectively. The D.C. current proportional to the zero degree phase component of the error signal is then applied to that servo magnetometer in the detecting set driven by the zero degree phase output of the oscillator. The other servo magnetometer in the detecting set is driven and controlled in a similar manner with respect to the ninety degree (90°) phase output of the oscillator. The functional electrical hookup of the inventive apparatus incorporated in the automatic orientation system of Fig. 1 is best shown in Fig. 2 and its supplementary figure drawings. It should be noted at this point that oscillator 21 of Fig. 2 comprises stages V4, V5A and V5B of Figs. 2a, 2b, 2c, and 2d, amplifier 23 is stage V8B, amplifier 24 is stage V8A, 0° phase detector 25 comprises stages V9A, V9B, V10A and V10B, the 90° phase detector comprises stages V6A, V6B, V7A and V7B and the band pass amplifier and phase inverter comprises stages V1A, V1B, V2A, V2B, V3A and V3B, stage V3B being the phase inverter.

Fig. 2a, Fig. 2b, Fig. 2c, and Fig. 2d are to be taken together to form a composite schematic drawing of the automatic orientation apparatus shown in block diagram form in Fig. 2. Orient input shown on Fig. 2d is taken from junction points D and E of terminal strip J701 of the detector amplifier of the detecting set and sent through a band-pass amplifier comprising five triodes, the first four of which may be one-half of 12AX7 tubes and the fifth of which may be ½ of a 12AZ7 tube, tubes V1A, V1B, V2A, V2B and V3A. This input signal is coupled in through resistor R101 which may be of the order of .25 megohm and applied to the grid of the first triode V1A.

The first stage of the five section band pass amplifier, V1A has output taken off the cathode in order to present a low impedance to the remainder of the band pass amplifier and for the purpose of keeping the gain at a sufficiently low point. Amplification takes place throughout the next three stages, V1B, V2A and V2B and the output of V2B is fed to the grid of the fifth stage V3A. Tube V3A is a cathode follower for the purpose of providing a low impedance output to the phase detector and also for the purpose of limiting the gain at this point. The stages of the band pass amplifier differ from the conventional by virtue of the fact that the plate to grid coupling components constitute a 1 c.p.s. band pass filter, for example, capacitor C102 and resistor R103, etc. The plus error signal is taken at the output of stage V3A and applied to the zero degree (0°) and ninety degree (90°) phase detectors. The zero degree detector circuit of Fig. 2c comprises stages V9A, V9B, V10A and V10B, and the ninety degree detector circuit of Fig. 2a comprises stages V6A, V6B, V7A and V7B. The signal is sent through phase inverter V3B where a minus error signal 180 degrees out of phase with the plus error signal is produced and fed to the zero degree and 90° phase detectors. At the zero degree phase detector V9A the plus 0° signal is introduced for a purpose to be described below. The signal which has been phase inverted through V3B, the phase inverter tube called the negative error signal is taken at the plate of that tube and introduced at the grid of tube V9B for a purpose also to be described later in connection with the description of the positive error signal. Simultaneously, the positive error signal is introduced at the grid of tube V6A and the negative error signal is introduced at the grid of tube V6B. Stages V6A and V6B constitute the input stages of the 90° phase detector circuit. A one cycle oscillator, a Wein bridge oscillator, comprising stages V4, V5A and V5B as shown in Fig. 2b is used to generate a one cycle reference voltage for comparison in the phase detector circuits and also for application to the inner and outer axis magnetometers, in which respective bridges are developed resultant signal voltages which cause the servo or gimbal motors to subsequently respond, generating a cone as previously described. The oscillating type of motion imparted the detector magnetometer effectively produces a modulation envelope for the carrier in the detector magnetometer bridge.

If any misorientation of the first axis magnetometer or second axis magnetometer is present, the detector magnetometer is of course mis-aligned with the earth's magnetic field vector and a resultant sinusoidally modulated signal appears at the input of the detector amplifier of the detecting set, the modulation of the carrier voltage being proportional to that misorientation. The 1 c.p.s. intelligence after demodulation by rectifier 594 is thereupon fed to band-pass amplifier and inverter 22. The one cycle output of the Wein bridge oscillator is fed to the phase shift network comprising resistors R129 and R130, capacitor C111, resistors R131 and R132 and capacitor C112 to present a pair of voltages, one at a zero degree reference point and the other ninety degrees out of phase with the first reference voltage. The zero degree and ninety degree outputs from the phase shift network are fed respectively to the inner axis input and the outer axis input as previously indicated and shown in Fig. 2d. The signal at the junction point between resistor R129 and resistor R130 is fed from that point into tube V8A, the 90° reference amplifier. Output of the 90° reference amplifier V8A is a 90° reference signal which is further sent to the 90° phase detector circuit through the one megohm resistor R135 and simultaneously through R136, a one megohm resistor and thence to the input of the 90° phase detector. At the junction point between capacitor C112 and resistor R132, the 0° reference signal is sent to the 0° amplifier V8B. From the plate of 0° amplifier V8B, the amplified 0° signals are sent to resistor R159 and resistor R160, one megohm resistors leading to the input of the 0° phase detector V9A and V9B. At the 0° phase detector V9A and V9B the reference signal has been fed in from the one cycle oscillator through the 0° amplifier and any plus or minus error signals developed by reason of misorientation of the first or second axis magnetometer of any combination thereof. Simultaneously, reference signals from the one cycle oscillator and amplified in the 90° amplifier have been fed into the 90° phase detector and plus and minus combination error signals from the band pass amplifier are present in the 90° phase detector. These latter signals are due to misorientation of the first and/or second axis magnetometers.

The 0° phase detector only will be described at this point since both the 0° phase detector and the 90° phase detector act in exactly the same manner to orientate the detector magnetometer in aligned position with the earth's magnetic field. In the 0° phase detector, V9A and V9B, respectively, form adder tubes for the purpose of adding the positive error and reference signals and the negative error and reference signals, respectively. At the junction point resistor R157 and resistor R159, the reference signal and the positive error signal are introduced to the grid of tube V9A through coupling capacitor C121. At the junction point between resistor R158 and resistor R160, the negative error signal and the 0° reference signal appear and are coupled to the grid of tube V9B through coupling capacitor C122. These adder tubes form unity gain feed back amplifiers with low impedance output. Output of the error signal plus the 0° reference signal is fed to the detector V10A and output of the additive signal comprising the negative error signal and the 0° reference signal is fed to the detector V10B. The signals are rectified and filtered through a novel filter network comprising resistors R171, R173 and R172 and capacitors C126, C127, C125 and C128. Capacitors C127 and C128 provide additional filtering of ripple voltage to get a pure direct current at the junction of resistors R173 and R174, the current being fed to the inner axis orientor magnetometer bridge. Between capacitors C125 and C126 the circuit is grounded. The difference current signal proportional to the misorientation of the inner axis in the case of the 0° phase detector is applied at the junction point between resistors R173 and R174 to the input of the servo amplifier of the inner axis magnetometer shown at Fig. 2d. The filter network operates as follows:

Current from stage V10A passes through resistors R171 and R173 and current through detector V10B passes through resistors R172 and R174 and meets at the junction point between resistors R173 and R174. Since the current resulting from detector V10A is a result of the positive error signal and the zero reference signal and the current through detector V10B is a result of the minus error signal and the zero reference signal, the currents will be opposing and a difference current will appear at the junction point between resistor R173 and resistor R174. Operation of the phase detector in the automatic orientation system with particular reference to the novel filter circuit is contained below:

*Operation of phase detector for automatic orientation*

Because of mechanical and electrical limitation imposed by the detecting head and servo amplifier designs in magnetic detecting sets, the frequency for driving the head is limited to low values such as one cycle per second, making the conventional use of transformers in the phase detecting network difficult and undesirable. Thus, an important part of the inventive apparatus is the transformerless phase detector circuit which performs the adding and ground isolation functions conventionally performed with two transformers and described in Theory of Servo Mechanism by James Nichols Phillips, page 112, published by McGraw-Hill Book Company, Inc., 1947, vol. 25, Radiation Laboratories Series. The following description relevant to the theoretical operation of the phase detectors of the inventive apparatus is with reference to drawings shown in Figs. 3, 4 and 5.

1.0 Fig. 3 represents a general phase detector circuit. The inputs to the detector are $E_1$ and $E_2$. The output is the current $I_0$. $E_3$ is the rectified and filtered voltage $E_1$, and $E_4$ is the rectified and filtered voltage $E_2$.

1.1 In the case of the automatic orientation circuit, the input voltage $E_1$ consists of the reference signal voltage plus the error signal voltage and $E_2$ consists of the reference signal voltage minus the error signal voltage.

1.2 Discuss only operation of the zero degree channel (a) The reference signal voltage is $A \sin wt$ where $w = 2\pi f$ and $f = 1$ c.p.s.

(b) The error signal voltage is $E \sin (wt+\theta)$ where $w = 2\pi f$, $f = 1$ c.p.s., and $\theta$ is the phase difference between the reference signal voltage and the error signal voltage.

(c) If misorientation is present on the 0° channel only $\theta = 0°$ or 180°. If misorientation is present on the 90° channel only, $\theta = 90°$ or 270°. If misorientation is present on both channels $\theta$ is some value other than 0°, 90°, 180°, or 270°.

1.3 (1) $E_1 = A \sin wt + E \sin (wt+\theta)$ (2) $E_2 = A \sin wt - E \sin (wt+\theta)$ Expanding (1) and (2) yields (1a) $E_1 = A \sin wt + E \sin wt \cos \theta + E \cos wt \sin \theta$ $E_1 = (A + E \cos \theta) \sin wt + (E \sin \theta) \cos wt$ (2a) $E_2 = A \sin wt - E \sin wt \cos \theta - E \cos wt \sin \theta$ $= (A - E \cos \theta) \sin wt - (E \sin \theta) \cos wt$ Combining (1a) and (2a) into single term expressions (1b)

$$E_1 = \sqrt{(A+\cos\theta)^2 + (+E\sin\theta)^2} \cos(wt+\delta)$$

where $$\delta = \tan^{-1} \frac{E \sin \theta}{A + E \cos \theta}$$

$$= \sqrt{A^2 + E^2 + 2AE \cos \theta} \cos wt + \delta)$$

(2b)

$$E_2 = \sqrt{(A-E\cos\theta)^2 + (-E\sin\theta)^2} \cos(wt+\delta')$$

where $$\delta' = \tan^{-1} \frac{-E \sin \theta}{A - E \cos \theta}$$

$$E_2 = \sqrt{A^2 + E^2 - 2AE \cos \theta} \cos(wt+\delta')$$

1.4 Rectifying $E_1$ and $E_2$ by $V_1$ and $V_2$ yields (3a) $E_3 = kE_1$ where $k$ = constant of rectification $$= k\sqrt{A^2 + E^2 + 2AE \cos \theta}$$

(4a) $E_4 = -kE_2$ where $k$ = constant of rectification

The minus sign is employed since the negative portion of the signal is rectified.

$$E_4 = -k\sqrt{A^2 + E^2 - 2AE \cos \theta}$$

Expanding (2a) and (2b) by the binomial expression (3b)

$$E_3 = k[(A^2+E^2)^{1/2} + (A^2+E^2)^{-1/2} AE \cos \theta^{-1/2} \frac{A^2E^2 \cos^2\theta}{(A^2+E^2)3/2} + \cdots$$

(4b)

$$E_4 = -k[(A^2+E^2)^{1/2} - (A^2+E^2)^{-1/2} AE \cos \theta^{-1/2} \frac{A^2E^2 \cos^2\theta}{(A^2+E_2)3/2} - \cdots$$

1.5 The current flowing through $R_1$ is (5) $$I_1 = \frac{E_1}{R_1}$$

and through $R_2$ (6) $$I_2 = \frac{E_4}{R_2}$$

The total output current is (7) $I_0 = I_1 + I_2$

Substituting for $I_1$ and $I_2$, letting $R_1 = R_2 = R$ (7a) $$I_0 \cong \frac{K}{R}\left[\frac{2AE \cos \theta}{\sqrt{A^2+E^2}}\right]$$

Therefore, (7b) $$I_0 \cong \frac{2KA}{R} \cdot \frac{E \cos \theta}{\sqrt{A^2+E^2}}$$

1.6 Going back to Equation (1a) it is seen that the component of $E \sin (wt+\theta)$ in phase with the reference signal $A \sin wt$ is $E \cos \theta \sin wt$ which is proportional to the misorientation of the zero degree channel directly with the magnitude of the term $E \cos \theta$. Therefore it can be seen from (7b) that the output of the zero degree phase detector is a direct current that is proportional to the misorientation of zero degree servo channel.

1.7 The operation of the 90° detector can be shown to be identical with the 0° phase detector. However, the component of $E \sin (wt+\theta)$ in phase with the reference signal $A \cos wt$ in this instance is $E \sin \theta \cos wt$ which is proportional to $E \sin \theta$, where $E \sin \theta$ is the portion of the error signal derived from misorientation in the 90° servo channel.

2.0 *The phase detector.*—The phase detector in the automatic orientation circuit is a current output device whereas most phase detectors are voltage output devices. In the voltage output detector (Fig. 4) which shows a means of resolving a push-pull signal into a single-ended output, the reference and error signals, R and E, respectively, are fed to the detector through transformers $T_1$ and $T_2$. The output of the detectors, $E_1$ and $E_2$ are developed across the load resistors, $R_1$ and $R_2$, respectively, and the difference $E_1 - E_2$ is the signal to the load, $R_L$. The ground of the load circuit, $G_1$ is isolated from the ground of the detector circuit $G_2$, through the transformers $T_1$ and $T_2$.

2.1 In the automatic orientation circuit the low frequencies (1 c.p.s.) prohibit the use of transformers (Fig. 5). Therefore, the reference and error signals are added by an adder stage rather than by transformers. The positive peaks of $E_1$ and the negative peaks of $E_2$ are rectified. Since the ground of the load circuit $G_1$, and the ground of the detector circuit $G_1$ cannot be isolated from each other, the current corresponding to $E_1$ and the current corresponding to $E_2$ are simultaneously sent through the load, $R_L$, through resistors $R_1$ and $R_2$. The difference in currents that the load carries is proportional to the difference in voltage $E_1-E_2$ at the output of the detector. Thus, in fact, we have a transformerless phase detector with a ground system that is common with the load ground system.

It should be noted that in the above description parts labelled identically in Figs. 3, 4 and 5 would be the same part.

*Summary of automatic orientation system operation*

A representation of a portion of the AN/ASQ-8 Detecting Set in existence into which the orientation system of the invention may be tied is shown in Figs. 7 and 8, Fig. 7 substantially showing a portion of the Electronic Control Amplifier AM-294/ASQ-8 in order to demonstrate connection of the output of oscillator 21 of the inventive apparatus to the equipment, and Fig. 8 schematically showing a portion of Amplifier-Detector AM-295/ASQ-8 to demonstrate application of the demodulated output of the rectifier contained in the detecting set to the band-pass amplifier of the orienting apparatus of the instant invention. Part numbers used in this figure are identical to those used in the AN/ASQ-8 Instruction Manual so that completeness of operable disclosure may be presented.

The demodulated output from rectifier 594 of the detector amplifier is impressed on the band pass amplifier and phase inverter circuit 22 (see Fig. 1). This connection is made into the detector amplifier at a suitable point, for example, in the apparatus identified heretofore as detecting set AN/ASQ-8 it may be put directly into terminals D and E of junction 701, leading from the one megohm resistor R735 of that apparatus (see Fig. 8). It should be understood that in application to other detecting sets the inventive automatic apparatus may be hooked in at corresponding points. The demodulated signal taken from the cathode output of rectifier 594 of the detector amplifier will have a one cycle per second frequency and will be of amplitude proportional to the amount of deviation of the axis of the detector magnetometer from the earth's field vector. In other words, the signal impressed on the band pass amplifier circuit 22 will represent the deviation of the axis of the cone described by the detecting magnetometer from the axis of the earth's magnetic field. In the band pass amplifier 22 the signal from the detector magnetometer is amplified and any signal not of a one cycle frequency order is filtered out. The output of the band pass amplifier final stage V3A (see Fig. 2) will constitute the plus error signal and is applied directly to the 0° phase detector 25 and to the 90° phase detector 26. A portion of the output of the band pass amplifier 22 is applied to a phase inverter V3B (see Fig. 2) in that circuit. Phase inverter V3B has a gain of one and generates a signal 180 degrees out of phase with the plus error signal at the output of the last stage V3A of the band pass amplifier. This signal 180° out of phase is the minus error signal and is simultaneously applied to a second input of the 0° phase detector 25 and of the 90° phase detector 26.

The one cycle oscillator 21 has been feeding energy directly to the inner axis magnetometer and the outer axis magnetometer via the center taps of the secondaries of the respective output driving transformers to cause the axis of the detector magnetometer to describe a cone in the circular motion of the detector magnetometer about its axis. The output of one cycle oscillator 21 which may be the one cycle oscillator furnished in the magnetometer test set described or which may be supplied in an application of the present automatic orientation system shown in Fig. 9, is applied, for example, in the gear described as AN/ASQ-8 at G and H of terminal board J-504 shown in Fig. 7 of that equipment. The resultant asymmetrical signals appearing at the outputs of the inner and outer axis magnetometer bridges are applied to pulse amplifiers, 532 and 533, respectively, through capacitor C501 and C512 and transformer coupled through resistors R563 and R566 to the first stages of the servo amplifier channels, V501A, V501B and V506A and V506B. These voltages cause the circular movement of the detector magnetometer about its axis. The two outputs from the one cycle oscillator 21 represent sinusoidal voltages equal in amplitude and 90° out of phase (in quadrature phase) with respect to each other. A portion of the output of one cycle oscillator 21 is fed through the 0° amplifier 23 and applied to the 0° phase detector 25. A portion of the output of the one cycle oscillator 21 in quadrature phase with respect to the first output is applied to the 90° amplifier 24 and thence to the input of the 90° phase detector 26. In the 0° phase detector 25 the plus error signal and the signal from the 0° amplified 23 are added and the minus error signal and the signal from the 0° amplifier 23 are added and a single output is produced representing the phase difference between the reference signal from the 0° amplifier 23 and the total error signal from the band pass amplifier and phase inverter 22. The same applies to the 90° phase detector 26, the total error signal being compared in phase with the reference signal from the 90° amplifier 24 in that phase detector. The signals from the 0° phase detector 25 and the 90° phase detector 26 are D.C. signals representing correction voltages to realign the axis of the detector magnetometer with the earth's magnetic field. The D.C. output of the 0° phase detector 25 and the 90° phase detector 26 is applied to the orientor magnetometer bridge circuits which is a common point with the input to the servo amplifiers of the detecting set. Obviously, the equipment shown may be applied to other detecting sets and it should be understood that the invention is not intended to be restricted to the particular detecting set described and that with obvious changes apparent to one skilled in the art this automatic orientation system may be applied to any apparatus of that general nature.

There is thereby provided an orientation system for magnetometers providing a method and apparatus which by applying two equal sinusoidal currents in quadrature phase with each other simultaneously to inner and outer axis magnetometers of a detecting set will cause the detector magnetometer of that set to describe a circular path, misalignment causing deviation of the axis of the cone generated by the axis of the detector magnetometer to present a magnetic signal representing the magnitude of such deviation and the method and apparatus further provides means for orienting the detector magnetometer to a position parallel to the earth's magnetic field, thereby simplifying manual orientation of magnetometers and permitting institution of the inventive system of automatic orientation of magnetometers. Although many uses of this system will readily be apparent, the system is especially adaptable to airborne magnetic detection methods for detecting the presence of submarines. There is thereby provided a rapidly acting system eliminating switching operations, doing away with readjusting of earth's field balance and other controls, insuring proper orientation, doing away with use of external batteries, doing away with necessity for frequent checks and especially applicable to light weight towed magnetometer systems and which will be easier to operate by personnel, which will be simpler and more reliable to use than the old manual method and wherein in-flight orientation and pre-flight orientation checks may be eliminated. In addition, no special aircraft carrier test facilities will be required for orientating towed bird installations of magnetic detecting equipment, optimum orientation within the range of control is furnished regardless of the nature and uniformity of the ambient magnetic field without adjustments and the equipment may be utilized without interrupting its operation.

It should be understood, of course, that the foregoing disclosure relates to only a preferred embodiment of the invention and that numerous modifications or alterations may be made therein without departing from the spirit and scope of the invention. Some examples of alternate methods of construction would include the use of any frequency and amplitude of driving current that the basic equipment can handle to make the orientation system workable. It should also be understood that use of transistors and germanium diodes and use of very low frequency transformers in the phase detecting network in a manner similar to the example cited may be made by one skilled in the art. Many changes and substitutions of different types of components can be made by one skilled in the art in the light of this disclosure. Although these values are in no sense to be construed as limiting the scope of the invention, the following table of values is given as illustrative of a successfully tested prototype of the orientation system of the illustrative embodiment:

| Element resistors: | Value (ohms) |
|---|---|
| R101 _____meg__ | .25 |
| R102, R113, R199 _____ | 100K |
| R103, R112 _____meg__ | 1.25 |
| R104, R110, R117, R122 _____ | 250K |
| R105 _____ | 1K |
| R106, R109, R114, R133, R134, R135 _____meg__ | 1 |
| R136, R137, R158, R159, R160__meg__ | 1 |
| R107, R126, R151, R156 _____ | 500K |
| R108 _____ | 3K |
| R111, R118, R120 _____ | 5K |
| R115, R137, R138, R162 _____meg__ | 3 |
| R116, R139, R140, R163, R164__meg__ | 1.3 |
| R401, R402 _____ | 10K–1 meg |
| R119, R121 _____ | * 75K |
| R123 _____ | 50K |
| R124, R125 _____ | 750K |
| R127 _____ | 15K |
| R129, R130, R131, R132 ** _____ | 40K |
| R141, R142, R165, R166 _____ | 300K |
| R143, R144, R167, R168 _____ | 6K |
| R145, R146, R169, R170 _____ | 150K |
| R147, R148, R149, R150, R171, R172, R173 _____ | 270K |
| R174 _____ | 270K |
| R152, R155 _____ | 10K |
| R153, R154 _____ | 6.2K |
| R128 _____meg__ | 4.7 |

\* 1 watt rating.
\*\* =1% tolerance.

| Capacitors: | Value (microfarads) |
|---|---|
| C101, C102, C105, C106, C113, C114, C121, C122 _____ | .1 |
| C103, C104, C109, C110 _____ | 1 |
| C107, C108 _____ | .22 |
| C111, C112, C115, C116, C123, C124__ | 4 |
| C117, C118, C125, C126 _____ | 12 |
| C119, C120, C127, C128 _____ | 50 |

| Tubes: | Designation |
|---|---|
| V1A, V1B, V2A, V2B, V5A, V5B __ | ½ of 12AX7 |
| V3A, V3B _____ | ½ of 12AU7 |
| V4 _____ | 5879 |
| V6A, V6B, V9A, V9B _____ | ½ of 12AT7 |
| V7A, V7B, V10A, V10B _____ | ½ of 6AL5 |
| V8A, V8B _____ | ½ of 12AX7 |

| Thermister: | |
|---|---|
| RT101 _____ | 21A |

Legend:
meg=$10^6$=1,000,000
K=$10^3$=1,000

Obviously, many modifications and variations of the present invention are possible in the light of the above teachings. It is, therefore, to be understood that within the scope of the appended claims the invention may be described otherwise than as specifically described.

What is claimed is:

1. A method of orienting a magnetic detecting set comprising a magnetometer system including three mutually perpendicular magnetometer devices, two of the magnetometer devices comprising orientor magnetometers, the third magnetometer comprising a detector magnetometer aligned in operative condition substantially parallel to the earth magnetic field vector, servo means operably coupled with the orientor magnetometers including orientation controls, which orientor magnetometers normally seek a null position at right angles to the earth magnetic field vector, said method comprising selectively simultaneously applying two sinusoidal currents which are in quadrature phase relation to the two orientor magnetometers, respectively, initiating response of the servo means to cause the detector magnetometer to describe a substantially circular path, the detector magnetometer generating a sinusoidal magnetic field signal in the presence of misalignment between the earth magnetic field vector and an axis perpendicular to the plane of the circular path, detecting for the presence of said misalignment, and manually adjusting the orientation controls of the servo means to reduce the sinusoidal magnetic field signal to a minimum rendering the detector magnetometer of said system substantially aligned with the earth magnetic field vector upon removal of the sinusoidal quadrature phase currents.

2. In a magnetometer system comprising a detector magnetometer, a first and a second axis orientor magnetometer, the respective magnetometers having sensitive axes, respectively disposed substantially perpendicular to mutually perpendicular planes, magnetometer driver means for supplying alternating current excitation to each of the magnetometers, and a first and a second axis servo means operably coupled with the orientor magnetometers and responsive in operative condition to normally maintain the orientor magnetometers at null seeking positions substantially at right angles to the earth magnetic field vector, the improvement comprising apparatus for indicating misalignment of the detector magnetometer due to deviation of the null seeking positions, said apparatus comprising, oscillator means to generate two sinusoidal currents in quadrature phase relation and operably connected electrically to supply respective phases of said sinusoidal currents to each of the orientor magnetometers to initiate response of the servo means causing the detector magnetometer to substantially describe a circular path, means for detecting a misorientation signal of magnitude proportional to the misalignment of the detector magnetometer with the earth magnetic field vector upon application of the sinusoidal currents, and means for indicating the presence of said misorientation signal.

3. In a magnetometer system comprising a detector magnetometer, a first and second axis orientor magnetometer, the respective magnetometers having sensitive axes respectively disposed substantially perpendicular in mutually perpendicular planes, magnetometer driver means for supplying alternating current excitation to each of the magnetometers, and a first and a second axis null seeking servo means including orientation controls operably coupled with the orientor magnetometers and responsive in operative condition to normally maintain the orientor magnetometers at null positions substantially at right angles to the earth magnetic field, the improvement comprising orientation apparatus for rendering the sensitive axis of the detector magnetometer substantially parallel with the earth magnetic field irrespective of changes in said null positions tending to cause misorientation, said apparatus comprising, oscillator means to generate two sinusoidal currents in quadrature phase relation and operably connected electrically to supply respective phases of said sinusoidal currents to each of the orientor magnetometers to initiate response of the servo means causing the detector magnetometer to describe a substantially circular path of relatively minute radius, means for detecting a misorientation signal of magnitude proportional to the misalignment of the detector magnetometer with the earth magnetic field upon application of the sinusoidal currents, and means for indication of the magnitude of the misorientation signal, whereby the orientation controls of the first and second servo means may be adjusted to reduce the indication to a minimum by reducing misalignment of the detector magnetometer with respect to the earth magnetic field.

4. In a magnetometer system comprising a detector magnetometer, a first and a second axis orientor magnetometer, the respective magnetometers having sensitive axes respectively disposed substantially perpendicular to mutually perpendicular planes, magnetometer driver means for supplying alternating current excitation to each of the magnetometers, and first and second axis null seeking servo means including orientation controls operably coupled with the respective orientor magnetometers and responsive in operative condition to normaly maintain the orientor magnetometers at null positions substantially at right angles to the earth magnetic field, the improvement comprising orientation apparatus for positioning the sensitive axis of the detector magnetometer substantially parallel with the earth magnetic field irrespective of changes in said null positions tending to cause misorientation, said apparatus comprising, oscillator means to generate two sinusoidal quadrature currents of a relatively low frequency and operably connected electrically to supply the respective phase currents to each of the orientor magnetometers to initiate response of the servo means causing the detector magnetometer to describe a substantially circular path of relatively minute radius, the detector magnetometer developing a sinusoidally modulated error signal of phase and magnitude corresponding to the attitude of the sensitive axis thereof relative to said magnetic field vector, demodulation means responsive to the detector magnetometer to effect a sinusoidal error signal of frequency equal to that of the impressed quadrature currents, amplifier means responsive to the demodulating means to amplify the error signal, and recording means for indicating said error signal, the orientation controls of the inner and outer servo means being adjusted to reduce the error signal to a minimum rendering the sensitive axis of the detector magnetometer substantially parallel with the earth magnetic field.

5. In a magnetometer system comprising a detector magnetometer, a first and a second axis orientor magnetometer, the respective magnetometers having sensitive axes respectively disposed substantially perpendicular to mutually perpendicular planes, magnetometer driver means for supplying alternating current excitation to each of the magnetometers, first and second axis null seeking servo means operably coupled with the orientor magnetometers and responsive in operative condition to normally maintain the orientor magnetometers at null positions substantially at right angles to the earth magnetic field vector, the improvement comprising automatic orientation apparatus for providing substantial coincidence of the sensitive axis of the detector magnetometer with the earth magnetic field irrespective of change in the null positions tending to cause misorientation, said apparatus comprising, oscillator means to generate a reference pair of sinusoidal voltages in quadrature phase relation and electrically coupled with each of the orientor magnetometers to supply respective phases thereto to initiate response of the servo means causing the detector magnetometer to describe a substantially circular path of relatively minute radius, the detector magnetometer generating a sinusoidally modulated error signal of phase and magnitude corresponding to the attitude of the sensitive axis thereof relative to the earth magnetic field, demodulating means responsive to the detector magnetometer to produce a sinusoidal error signal of the same frequency as the oscillator means, means responsive to the demodulating means to produce a pair of amplified error signals opposite in phase relative to each other, and means jointly responsive to the reference pair of sinusoidal quadrature phase voltages and the latter error signals to effect direct current positioning levels of magnitude and polarity corresponding to the character of the error signals and electrically coupled with each of the orientor magnetometers to supply thereto the positioning levels initiating response of the servo means to reposition the orientor magnetometers thereby providing substantial coincidence of the detector magnetometer with the earth magnetic field.

6. In a magnetometer system comprising a detector magnetometer, a first and a second axis orientor magnetometer, the respective magnetometers having sensitive axes respectively disposed substantially perpendicular to mutually perpendicular planes, magnetometer driver means for supplying alternating current excitation to each of the magnetometers, first and second axis null seeking servo means operably coupled with the orientor magnetometers and responsive in operative condition to normally maintain the orientor magnetometers at null positions substantially at right angles to the earth magnetic field, the improvement comprising automatic orientation apparatus for positioning the sensitive axis of the detector magnetometer substantially parallel with the earth magnetic field irrespective of changes in said null positions tending to cause misorientation, said apparatus comprising, oscillator means to generate two sinusoidal relatively low frequency voltages in quadrature phase relation and operably connected electrically to furnish respective phases of the sinusoidal voltage to each of the orientor magnetometers to initiate response of the servo means causing the detector magnetometer to describe a substantially circular path of relatively minute radius, the detector magnetometer developing a sinusoidally modulated error signal having a magnitude and phase corresponding to the attitude of the sensitive axis thereof relative to said earth magnetic field, demodulating means responsive to the detector magnetometer to develop a sinusoidal error signal of frequency equal to that of the impressed quadrature voltages, means responsive to the demodulating means to produce two amplified error signals each of a phase directly opposite relative to each other, amplifier means responsive to the oscillator means to amplify each of the sinusoidal quadrature voltages to obtain a reference pair of quadrature phase signals, and means jointly responsive to quadrature phase signals and the latter error signals to produce direct current positioning levels of magnitude and polarity corresponding to the character of the applied error signals and electrically coupled with the first and second axis orientor magnetometers to supply thereto respective positioning levels initiating response of the servo means to reposition the orientor magnetometers to thereby reorient the detector magnetometer substantially parallel with the earth magnetic field.

7. In a magnetometer comprising a detector magnetometer, a first and a second axis orientor magnetometer, the respective magnetometers having sensitive axes respectively disposed substantially perpendicular to mutually perpendicular planes, magnetometer driver means for supplying alternating current excitation to each of the magnetometers, first and second axis null seeking servo means operably coupled with the orientor magnetometers and responsive in operative condition to normally maintain the orientor magnetometers at null positions substantially at right angles to the earth magnetic field, the improvement comprising automatic orientation apparatus for positioning the sensitive axis of the detector magnetometer substantially parallel with the earth magnetic field irrespective of changes in the null positions tending to cause misorientation, said apparatus comprising oscillator means including a resistive capacitive phase shift network to effect a reference pair of sinusoidal quadrature phase voltages each applied to the first and second axis orientor magnetometers through respective resistors to initiate response of the servo means causing the detector magnetometer to describe a substantially circular path of relatively minute radius, the detector magnetometer generating a sinusoidally modulated error signal of phase and magnitude corresponding to the attitude of the sensitive axis thereof relative to the earth magnetic field, detection means capacitively coupled with the detector magnetometer including a diode rectifier element to demodulate the sinusoidally modulated error signal to effect an error signal of the same frequency as the oscillator means, a bandpass amplifier responsive to the detection means to amplify the error signal frequency to the exclusion of frequency components falling within the bandwidth of magnetic anomaly signals including a phase inverter of unity gain to produce a pair of amplified error signals opposite in phase relative to each other, and means jointly responsive to the reference pair of sinusoidal quadrature phase voltages and the latter error signals to effect direct current positioning levels of magnitude and polarity corresponding to the character of the error signals and electrically coupled with each of the orientor magnetometers to supply thereto respective positioning levels initiating response of the servo means to reposition the orientor magnetometers to thereby reorient the detector magnetometer substantially parallel with the earth magnetic field.

8. In a magnetometer system comprising a detector magnetometer, a first and a second axis orientor magnetometer, the respective magnetometers having sensitive axes respectively disposed substantially perpendicular to mutually perpendicular planes, magnetometer driver means for supplying alternating current excitation to each of the magnetometers, first and second axis null seeking servo means operably coupled with the orientor magnetometers and responsive in operative condition to normally maintain the orientor magnetometers at null positions substantially at right angles to the earth magnetic field, the improvement comprising automatic orientation apparatus for positioning the sensitive axis of the detector magnetometer substantially parallel with the earth magnetic field irrespective of changes in the null positions tending to cause misorientation, said apparatus comprising, oscillator means to generate a reference pair of sinusoidal quadrature phase voltages of relatively low frequency and electrically coupled with each of the orientor magnetometers to supply respective phases thereto to initiate response of the servo means causing the detector magnetometer to describe a substantially circular path of relatively minute radius, the detector magnetometer generating a sinusoidally modulated error signal of phase and magnitude corresponding to the attitude of the sensitive axis thereof relative to the earth magnetic field, demodulating means responsive to the detector magnetometer to produce a sinusoidal error signal of the same frequency as the oscillator means, means responsive to the demodulating means to produce a pair of amplified error signals each of a phase directly opposite relative to each other, a 0° amplifier responsive to the oscillator means to obtain a reference 0° sinusoidal signal, a 90° amplifier responsive to the oscillator means to obtain a reference 90° sinusoidal signal, a 0° phase sensitive means constructed and arranged for joint response to the 0° reference signal and the error signals to effect a direct current positioning level of magnitude and polarity corresponding to the 0° component of the applied error signals and a 90° phase sensitive means constructed and arranged for joint response to the 90° reference signal and the error signals to effect a direct current positioning level of magnitude and polarity corresponding to the 90° component of the applied error signal, the 0° and 90° phase sensitive means each respectively electrically coupled to the first and second axis orientor magnetometers to supply thereto the associated positioning levels initiating response of the servo means to reposition the orientor magnetometers to thereby reorient the detector magnetometer substantially parallel with the earth magnetic field.

9. The automatic orientation apparatus of claim 8 in which the phase sensitive means include at least two summing amplifiers each effecting arithmetic addition of a respective reference phase signal with its associated error signal.

References Cited in the file of this patent

UNITED STATES PATENTS

| | | |
|---|---|---|
| 2,468,554 | Hull | Apr. 26, 1949 |
| 2,488,341 | Slonczewski | Nov. 15, 1949 |
| 2,518,513 | Wyckoff | Aug. 15, 1950 |
| 2,555,209 | Vacquier et al. | May 29, 1951 |
| 2,689,333 | Hare | Sept. 14, 1954 |

UNITED STATES PATENT OFFICE
Certificate of Correction

May 12, 1959

Patent No. 2,886,773

Maurice Potosky et al.

It is hereby certified that error appears in the printed specification of the above numbered patent requiring correction and that the said Letters Patent should read as corrected below.

Column 5, lines 20, 21 and 22 should appear as shown below instead of as in the patent:

magnetometer. These magnetic fields cause un-
    desirable noise and are to be avoided.

line 23, after "above" strike out the comma; column 7, line 9, for "potential" read —potentials—; column 10, line 54, after "tions" insert a period; line 57, for "26", first occurrence, read —25—; column 11, line 20, for "12AZ7" read —12AU7—; column 12, line 31, for "of any" read —or any—; line 46, after "point" insert —between—; column 13, line 22, for "James Nichols Phillips," read —James, Nichols, Phillips,—; line 44, for "$O=90°$ or $270°$" read —$\theta=90°$ or $270°$—; lines 64 and 72, for "tan-1" each occurrence, read —$\tan^{-1}$—; column 14, line 17, for "$(A^2+E^2)3/2$" read —$(A^2+E^2)^{3/2}$—; line 22, for "$(A^2+E_2)3/2$" read —$(A^2+E^2)^{3/2}$—; line 25, for "$E_1$" read —$E_3$—.

Signed and sealed this 17th day of November 1959.

[SEAL]

Attest:
KARL H. AXLINE,
Attesting Officer.

ROBERT C. WATSON,
Commissioner of Patents.